United States Patent [19]

Hansen

[11] Patent Number: 4,466,456
[45] Date of Patent: Aug. 21, 1984

[54] PROGRAMMABLE MULTIPORT SWITCH

[75] Inventor: Gary P. Hansen, Federal Way, Wash.

[73] Assignee: Red Dot Corporation, Seattle, Wash.

[21] Appl. No.: 443,232

[22] Filed: Nov. 22, 1982

[51] Int. Cl.³ .................... F16K 11/14; F16K 31/524
[52] U.S. Cl. ........................... 137/596.2; 137/624.11; 137/871; 74/567
[58] Field of Search .................. 251/263; 137/624.11, 137/624.18, 627, 596.1, 596.2, 867, 871, 601; 74/567, 569

[56] References Cited

U.S. PATENT DOCUMENTS

| | | |
|---|---|---|
| 491,272 | 2/1893 | Schier . |
| 831,049 | 9/1906 | Fitzgibbon et al. . |
| 1,822,117 | 9/1931 | Travis . |
| 2,129,100 | 9/1938 | Pickup .................................. 137/21 |
| 2,275,963 | 3/1942 | Herman et al. ...................... 277/20 |
| 2,335,525 | 11/1943 | Matter ................................. 137/144 |
| 2,580,553 | 1/1952 | King .............................. 251/263 X |
| 3,338,550 | 8/1967 | Coulter .............................. 251/263 |

Primary Examiner—Alan Cohan
Attorney, Agent, or Firm—Joan H. Pauly; Delbert J. Barnard

[57] ABSTRACT

A housing (28) has parallel passageways (30). Each passageway (30) has an inlet port (34) and an outlet port (32). A valve stem (26) with a head (36) reciprocates in each passageway (30) to control the outlet port (32). A flat plate (22) rotates perpendicularly to the stems (26) and has flat surface portions (48) and cavities (46). The positioning of portions (48) and cavities (46) is programmed to bring one of them into alignment with each stem (26) when plate (22) is in any one of a number of predetermined positions. When a portion (48) is moved into alignment, it bears against the head (36) and moves the stem (26) inwardly against a spring (38) into a second position. When a cavity (46) is moved into alignment, the stem (26) is urged into its first position by spring (38) and its head (36) extends into the cavity (46). Each stem (26) carries an O-ring seal (40) which is on one side of outlet port (32) when stem (26) is in its first position and on the other side of port (32) when stem (26) is in its second position. Ports (34, 32) communicate with each other when stem (26) is in its first position. Seal (38) blocks this communication when stem (26) is in its second position. Preferably, a manifold (64) communicates with each inlet port (34).

22 Claims, 7 Drawing Figures

PROGRAMMABLE MULTIPORT SWITCH

DESCRIPTION

1. Technical Field

This invention relates to switches and, more particularly, to a switch in which an actuating plate moves perpendicularly to a valve stem to control the stem, the plate includes at least one cavity for valve control and detent action, and the stem carries a seal.

2. Background Art

A primary object of this invention is to provide an improved switch for a vehicle climate control system. Known switches for such systems take a variety of forms, each of which has its own set of problems. In many trucks, the climate control system currently has multiple toggle switches which the driver operates directly and individually. A major problem with the multiple switches is that the driver must activate the right combination of switches to obtain the desired climate control. This can be difficult, and the result is frequently quite different from that desired by the driver. The multiple switch arrangements also have the problems of being relatively complex and expensive. In many passenger cars, the climate control system currently has one lever with multiple positions. This lever is attached to a number of cables which the lever pushes and pulls when it is moved by the operator. This arrangement has several problems connected with it. It is frequently difficult to obtain the correct positioning of the lever to push or pull each of the cables into the desired position. In addition, the switching mechanism is relatively complex and expensive and has limited durability and, therefore, reliability. Both of the known switching mechanisms described above are limited in that their parts are not readily interchangeable for use in other climate control systems or other systems requiring a switching mechanism.

Each of the following United States patents discloses a valve in which a valve stem is controlled by a cam surface that acts on the head of the valve stem.

U.S. Pat. No. 491,272, granted Feb. 7, 1893, to A. Schier;

U.S. Pat. No. 831,049, granted Sept. 18, 1906, to J. J. Fitzgibbon and J. M. Travis;

U.S. Pat. No. 1,822,117, granted Sept. 8, 1931, to J. M. Travis;

U.S. Pat. No. 2,129,100, granted Sept. 6, 1938, to G. E. Pickup;

U.S. Pat. No. 2,275,963, granted Mar. 10, 1942, to K. R. Herman and K. Seidel; and U.S. Pat. No. 2,335,525, granted Nov. 30, 1943, to A. J. Matter.

The above patents and the prior art that is discussed and/or cited therein should be studied for the purpose of putting the present invention into proper perspective relative to the prior art.

DISCLOSURE OF THE INVENTION

An object of this invention is to provide an improved switch for use in a vehicle climate control system and other environments with similar switching requirements. The improved switch is programmable so that moving the movable actuating member into each one of a plurality of predetermined positions produces a particular desired combination of closed and/or open valves. The switch of the invention can easily be reprogrammed for use in a different system or for modifying the system in which it is installed by simply providing a different movable member.

According to a basic aspect of the invention, a switch comprises a valve housing, a valve stem, biasing means, and a movable member. The valve housing includes a passageway that has at least one port. The valve stem is positioned to reciprocate longitudinally in the passageway to control the port. The stem includes a head and has a first position and a second position. The biasing means biases the stem toward its first position. The movable member is positionable adjacent to a housing surface and movable in a direction essentially perpendicular to the direction of reciprocation of the stem. The movable member includes an essentially flat surface portion and at least one cavity. The positioning of the surface portion and the cavity is programmed to bring one of said portion and said cavity into alignment with the valve stem head when the movable member is in any one of a plurality of predetermined positions. When the surface portion is moved into alignment with the head, said portion bears against the head and moves the stem inwardly against the force of the biasing means into its second position. When the cavity is moved into alignment with the head, the stem is urged into its first position by the biasing means. When the stem is in its first position, an outer portion of the head extends into the cavity and an inner portion of the head is seated against an edge portion of the cavity.

Preferably, said housing surface is essentially flat, and the movable member comprises an essentially flat plate that is substantially parallel to said housing surface. The cavity may comprise, for example, a hole extending through the plate or a dimple on the flat plate. When the cavity comprises such a dimple, a central portion of the dimple preferably has a hole extending therethrough.

According to a preferred aspect of the invention, the switch further comprises seal means surrounding and carried by the stem. This seal means is in sealing contact with a passageway sidewall all the way around the sidewall when the stem is in its first position or its second position. The seal means is on one side of the port when the stem is in its first position and on the other side of the port when the stem is in its second position. The port is in communication with the passageway when the stem is in its first or second position.

According to an aspect of the invention, said port is an outlet port, and the switch further comprises an inlet port in the passageway positioned inwardly of the outlet port. The inlet port and the outlet port are in communication with each other when the stem is in its first position. Communication between the inlet port and the outlet port is blocked by the seal means when the stem is in its second position. Preferably, fluid in the outlet port exhausts through the outer end of the passageway when the stem is in its second position. Such an exhausting of fluid makes the switch essentially self-cleaning, thereby cutting down on maintenance and increasing durability.

The switch of the invention has additional preferred features. One such feature is the provision of pivot connecting means for rotatably attaching the movable member to the valve housing. Another such feature is a movable member that includes an integral handle portion for moving the movable member with respect to said housing surface.

According to another basic aspect of the invention, the switch comprises a valve housing that includes a plurality of essentially parallel passageways, each of which has at least one port. A valve stem is positioned to reciprocate longitudinally in each of the passageways to control the corresponding port. Each of the stems includes a head and has a first position and a second position. Biasing means are provided for biasing each stem towards its first position. The switch also includes a movable member positionable adjacent to a housing surface and movable in a direction essentially perpendicular to the direction of reciprocation of the stems. This movable member includes a plurality of essentially flat surface portions and a plurality of cavities. The positioning of the surface portions and the cavities is programmed to bring one of said portions or one of said cavities into alignment with each valve stem head when the movable member is in any one of a plurality of predetermined positions. When any one of said surface portions is moved into alignment with any one of the heads, said portion bears against said head and moves the corresponding stem inwardly against the force of the biasing means into its second position. When any one of said cavities is moved into alignment with any one of the heads, the corresponding stem is urged into its first position by its biasing means. When any one of the stems is in its first position, an outer portion of its head extends into one of the cavities and an inner portion of its head is seated against an edge portion of said cavity.

According to another preferred aspect of the invention, each passageway has an inlet port and an outlet port, and the valve housing further includes a manifold in open communication with at least two of the inlet ports.

Another feature of the invention is an elongated cavity. In switches constructed according to the invention that include this feature, at least one of said cavities is elongated to allow a valve stem, which is in its first position with its head extending into said elongted cavity when the movable member is in a first one of its predetermined positions, to remain in its first position when the movable member is moved from said first predetermined position to a second predetermined position.

Switches constructed according to the invention have numerous advantages. They are constructed with a minimum number of parts, are relatively inexpensive to manufacture and maintain, and are rugged, reliable, and easy to operate. In addition, switches constructed according to the invention are highly versatile. Their versatility is due in large part to the fact that they are programmable to meet the switching needs of any particular situation and to the fact that they can be provided with any number of valves controlled by valve stems. As noted above, a particular switch can easily be reprogrammed simply by changing the movable member.

Switches constructed according to the invention in which the movable member is in the preferred form of a flat plate have additional advantages. Flat plates are relatively easy and inexpensive to manufacture, and therefore, the provision of a movable member in the form of a flat plate adds to the economic advantages of a switch constructed according to the invention. When the flat plate is provided with the preferred feature of an integral handle, the durability and ease of operation of the switch is increased. A movable actuating member in the form of a flat plate also has the advantage of requiring little space so that it is more easily installed in environments in which space is limited.

In switches constructed according to the invention, the movable member is provided with one or more cavities and with one or more flat surface portions to control the valve stem or stems, as described above. This construction is particularly efficient because the cavities perform multiple functions. These functions include positioning the valve stems in their first and second positions, providing seats for the valve stem heads, and providing detents for positioning the movable member. The effectiveness of the detent action is enhanced by the biasing means urging the stem toward its first position. It is also significantly enhanced when, as preferred, inflowing air or other fluid exerts an outward force on the valve stem. Such an outward force is present in switches with the preferred porting arrangement described above. A movable member with a cavity and flat surface portion construction has the additional advantage of requiring movement in only one plane in order to function. The movable member moves in a direction essentially perpendicular to the direction of reciprocation of the stem or stems, and there is no need for the movable member to move toward and/or away from the housing. This perpendicular motion adds to the ruggedness, ease of operation, and space saving advantages of the switch.

A number of the preferred features of the switch of the invention provide additional advantages and/or enhance the advantages of the basic construction of the invention. When the switch is provided with seal means surrounding and carried by the valve stem, the ease of manufacture of the switch is enhanced and ease of assembly is also provided. In switches with such a seal means, only one seal is required in most applications, further reducing the cost of manufacturing and maintaining the switch. When the switch operates to move the seal means from one side to the other side of the port being controlled, greater tolerances in the dimensioning of the switch are possible since the seal need not be aligned with the port. The greater tolerances add to the economy of manufacture of the switch.

When the movable member is attached to the valve housing by pivot connecting means, the ease and economy of manufacture and the ease of operation of the switch are all enhanced. The provision of a manifold, such as described above, enhances the economic advantages of the switch and its versatility since it provides a compact and reliable means for directing fluid from a single source through or past a plurality of valves. The self-cleaning advantages of exhausting fluid through the top of the passageway are explained above.

The cavity or cavities in the movable member of each switch constructed according to the invention may take a variety of forms. Each form has its own advantages. A cavity in the form of a hole extending through the movable member is simple and inexpensive to manufacture and, in a switch in which fluid is exhausted through the top of the passageway, promotes the exhausting of the fluid. A cavity in the form of a dimple on the movable member can easily be constructed to have no sharp edges, but rather a smooth curved inner surface. Such an inner surface smoothes the camming action of the valve stem head against the cavity and, therefore, provides a smoother operation of the switch. The smoother operation greatly reduces wear of the parts of the switch and increases the switch's durability. A dimple with a central hole promotes exhaust of fluid as described in connection with a cavity in the form of a hole. A switch constructed according to the invention may be provided with an elongated cavity, whether in the form of a hole or a dimple, to give the switch even greater versatility.

It should be clear that switches constructed according to the invention do not present any of the problems discussed above in relation to switching mechanisms that are currently in common use in vehicle climate control systems. The switches of the invention provide automatic selection of the desired combination of climate control features by operating a single control member that is easily positioned. They are durable, reliable, and easy and inexpensive to manufacture and maintain. In addition, their parts are interchangeable for greater economy and versatility.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 7 is a sectional view of a portion of the movable member, showing a cavity in the movable member in the form of a dimple with a central hole.

BEST MODE FOR CARRYING OUT THE INVENTION

Figure 1:
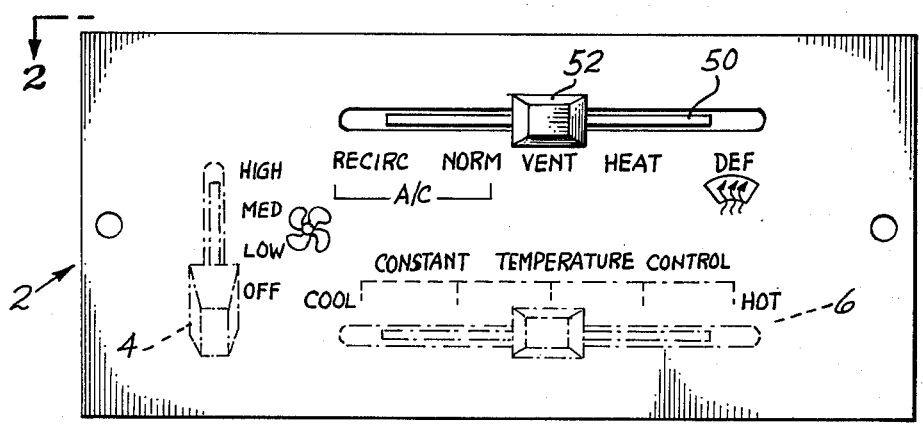
FIG. 1 is an elevational view of a portion of a vehicle dashboard in which the preferred embodiment of the invention has been installed.
Figure 2:
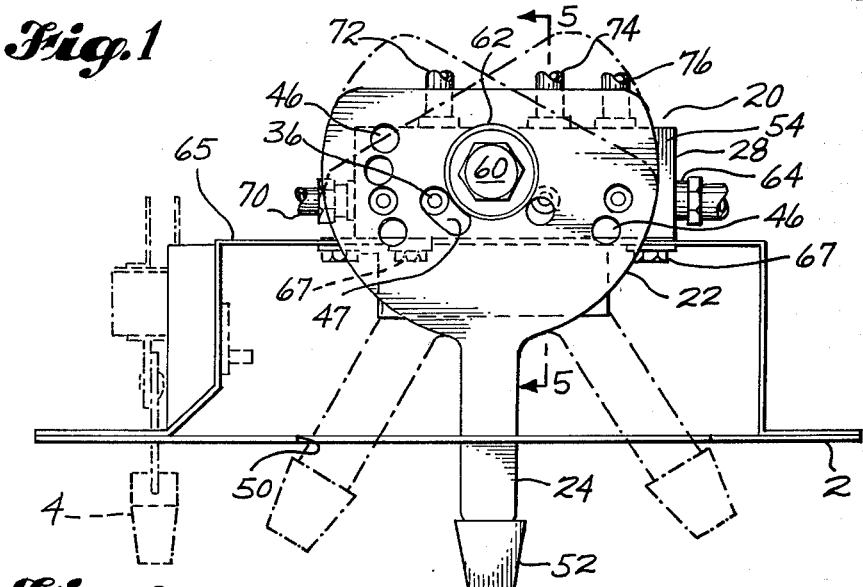
FIG. 2 is a top plan view taken along the line 2—2 of FIG. 1.
Figure 3:
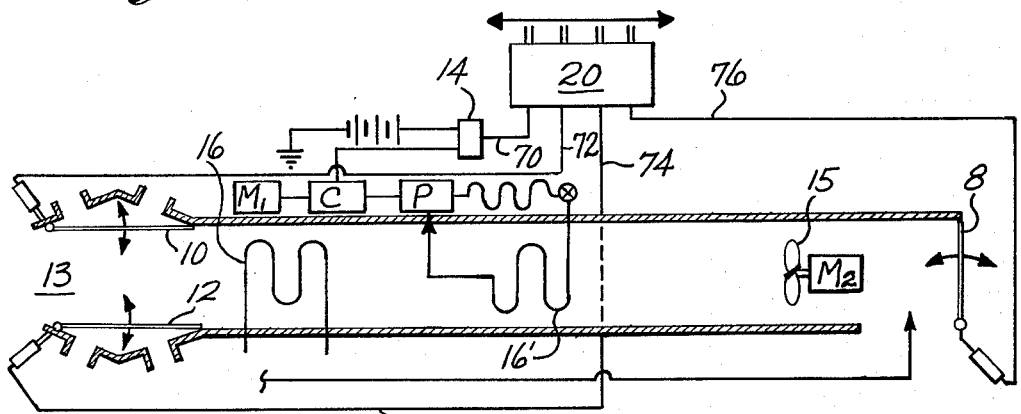
FIG. 3 is a schematic diagram of the climate control system of a vehicle, incorporating the preferred embodiment of the invention.

The drawings show a programmable multiport switch 20 that is constructed according to the invention and that also constitutes the best mode of the invention currently known to the applicant. FIGS. 1-3 show the switch 20 in a typical installation in the climate control system of a vehicle. The switch 20 is installed in the dashboard 2 of the vehicle with a handle portion 24 of the movable member 22 extending through the dashboard 2 into the passenger compartment. The front of the dashboard 2 facing the passenger compartment is labeled to indicate the climate control mode attained by placing the movable member 22 in each one of five positions. In close proximity to the handle 24 and its five labeled positions, are a fan switch 4 and a temperature control 6. These last two features are a part of the climate control system of the vehicle but form no part of the present invention.

In the preferred embodiment of the invention, the switch 20 may be said to be four switches in one in that it includes four separate valve stems 26. FIG. 3 is a schematic diagram of a vehicle climate control system incorporating the preferred embodiment of the switch 20. Each of the four valve stems 26 controls the admission of compressed air into a conduit. Each of the conduits leads to a device that is pressure operated. A first one of the valve stems 26 controls the admission of compressed air into a conduit 70 that leads to a pressure switch 14, which when activated engages the clutch C which allows motor $M_1$ to operate the compressor P of the air-conditioning system. Each of the other three valve stems 26 controls the admission of pressurized air into a conduit 72, 74, 76 that leads to a pressure operated door. One of these doors 8 controls the admission of air into the climate control system. Door 8 has a first position in which it admits air from outside the vehicle and a second position in which it admits air from inside the passenger compartment when the climate control system is in a recirculate mode. The other two doors 10, 12 direct air leaving the climate control system into outlets in the passenger compartment. For example, air may be directed toward the windshield for defrosting, toward the floor for heating, or at chest level for air-conditioning, or through some combination of levels of outlets in the passenger compartment.

In FIG. 3, both of doors 10, 12 are shown closed so that the air from the climate control system moves outwardly through a main passgeway 13. When either of doors 10, 12 is open, air in the main passageway 13 is diverted through an alternate outlet system. Air enters the climate control system from the outside or from the passenger compartment at the location of door 8. The air passes fan 15, air-conditioner coil 16', and heating coil 16 and then exits the climate control system and enters the passenger compartment as described above. The fan 15 and the heating coils 16 are controlled by the fan switch 4 and the temperature control 6 mentioned above.

In the preferred embodiment shown in the drawings, the switch 20 includes a valve housing 28 that has four passageways 30 which are essentially parallel to each other. Each of the passageways 30 is open at a housing surface 54 and extends inwardly into the housing 28 in a direction generally perpendicular to the surface 54. There are two ports in open communication with each of the passageways 30, an inlet port 34 and an outlet port 32. Each of the outlet ports 32 leads into a separate conduit through which compressed air is directed to activate a pressure device, as described above. Each of the inlet ports 34 is in open communication with a manifold 64 and receives compressed air through the manifold 64 from a common source.

Figure 5:
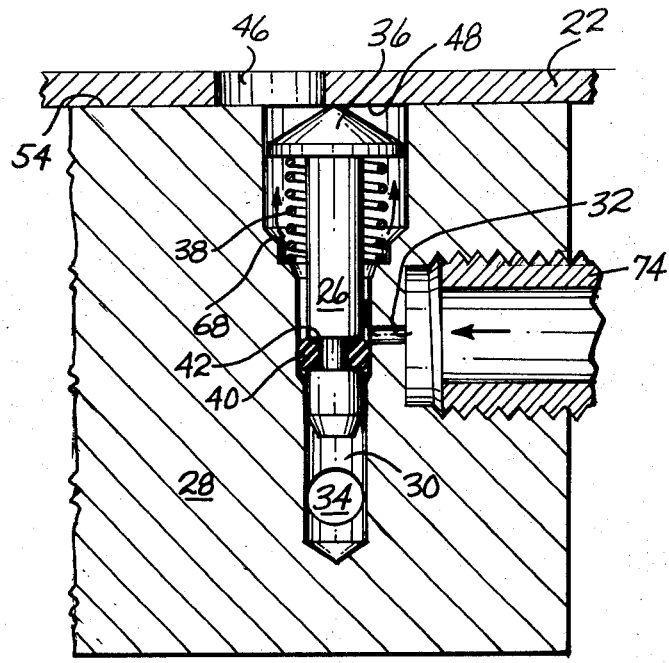
FIG. 5 is a sectional view of a portion of the preferred embodiment of the invention, showing some parts in plan and showing a valve stem in its second position and fluid exhausting through the top of a passageway.

A valve stem 26 is positioned in each passageway 30 to reciprocate longitudianally in the passageway 30. As the stem 26 reciprocates, it controls the outlet port 32. When the stem 26 is in its first position, shown in FIG. 6, the inlet port 34 and the outlet port 32 are open communication with each other through the passageway 30 and communication between the upper end of the passageway 30 and both the inlet port 34 and the outlet port 32 is blocked. When the stem 26 is in its second position, shown in FIG. 5, communication between the inlet port 34 and the outlet port 32 is blocked, and the outlet port 32 and the top of the passageway are in open communication through the passageway 30. This communication between the outlet port 32 and the top of the passageway 30 allows residual compressed air in the outlet conduit to exhaust through the top of the passageway 30.

Each valve stem 26 has an essentially conical head 36 at its outer end with the "point" of the cone pointing outwardly. Each valve stem 26 is also provided with a spring 38 for biasing the stem 26 toward its first position. The spring 38 is disposed around the valve stem 26 in an enlarged diameter outer portion of the passageway 30, with one end of the spring 38 bearing against the head 36 of the valve stem 26 and the other end bearing against a shoulder 68 formed by the passageway 30.

A movable member 22 is positioned closely adjacent to the housing surface 54 and is movable in a direction essentially perpendicular to the direction of reciprocation of the valve stems 26. In the preferred embodiment shown in the drawings, housing surface 54 is essentially flat, and the movable member comprises an essentially flat plate 22 that is substantially parallel to housing surface 54. Plate 22 has a plurality of essentially flat surface portions 48 and a plurality of cavities 46. The positioning of the flat surface portions 48 and the cavities 46 is programmed to bring one of the flat surface portions 48 or one of the cavities 46 into alignment with each valve stem head 36 when the plate 22 is in any one of a plurality of predetermined positions. The programming of the plate 22 provides the desired combination of open and closed communication between the inlet ports 34 and the outlet ports 32 for a given predetermined position of the plate 22. The operator need only choose one of the climate control modes indicated on the dashboard of the vehicle, as shown in FIG. 1, by positioning the plate 22; the programming of the plate 22 provides the right combination of open and closed valves.

Figure 6:
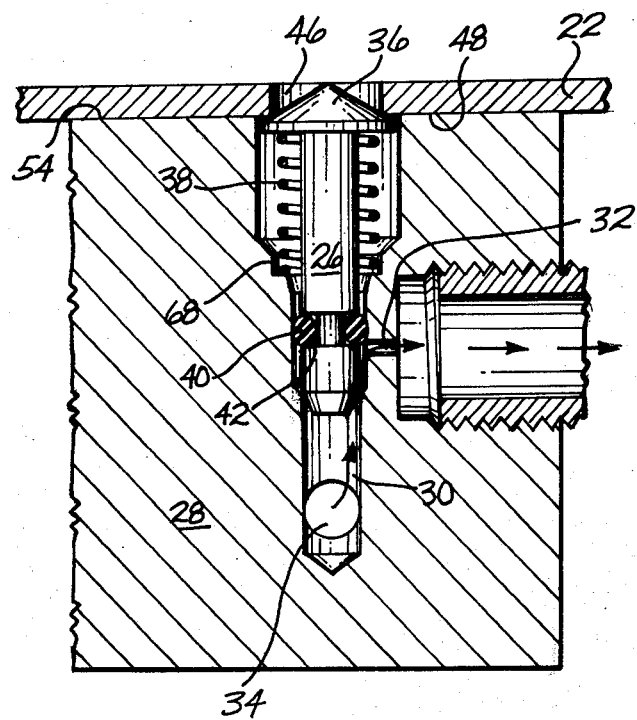
FIG. 6 is like FIG. 5 except that the valve stem is shown in its first position with the inlet and outlet ports in communication with each other.

The plate 22 operates to move or hold the valve stems 26 into their second positions and/or to allow the springs 38 to move the valve stems 26 into their first positions. When a flat surface portion 48 is moved into alignment with a valve stem head 36, the surface portion 48 bears against the valve stem head 36 and moves the stem 26 inwardly against the force of the spring 38 into its second position. When a cavity 46 is moved into alignment with a valve stem head 36, the valve stem 26 is urged into its first position by the spring 38. When a valve stem 26 is in its first position, the outer portion of its head 36 extends into the cavity 46 with which it is aligned, and an inner portion of the head 36 is seated against an edge of the cavity 46, as shown in FIG. 6.

Figure 4:
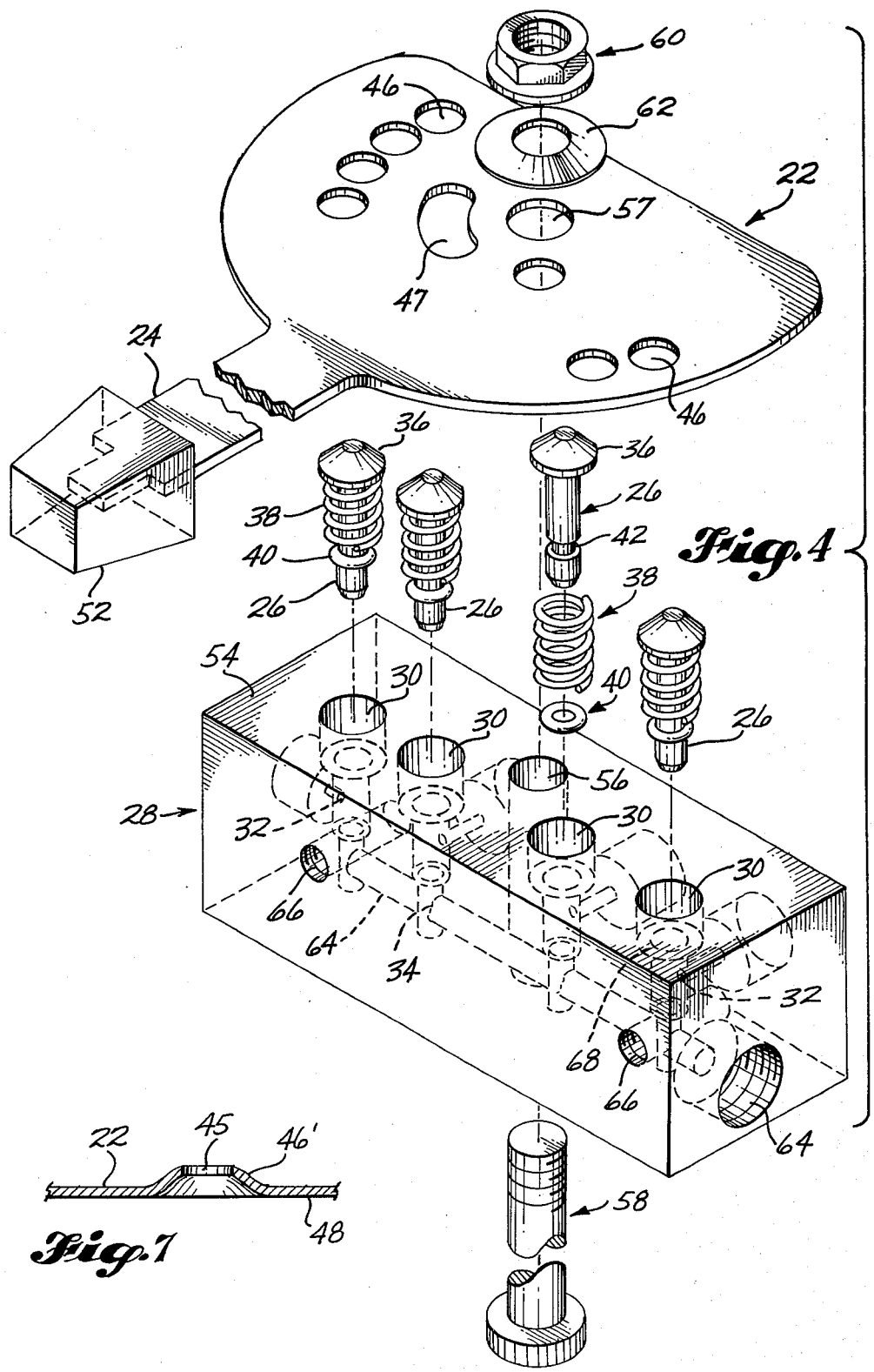
FIG. 4 is an exploded pictorial view of the preferred embodiment of the invention.

The cavities 46 may take a variety of forms. In the preferred embodiment shown in FIGS. 2 and 4–6, each cavity 46 is in the form of a hole 46 extending through the plate 22. As shown in FIGS. 2 and 4, all but one of the holes 46 is circular. When a valve stem head 36 is aligned with one of these circular holes 46, the head 36 seats against the edge of the hole 46 nearest the housing surface 54 all the way around the hole 46 and the head 36. FIGS. 2 and 4 show an alternate form of cavity that is easily combined with the circular holes 46. This alternate form is an elongated hole 47 that is circular at its ends. Such a hole 47 makes it possible for a particular valve stem 26 to remain in its first position when the plate 22 is moved from a first predetermined position to a second predetermined position. When a valve stem head 36 extends into an elongated cavity 47, a portion of its circumference seats against edge portions of the elongated cavity 47.

FIG. 7 shows another preferred form of the cavity which is formed by a dimple 46' on the plate 22. The dimple 46' has an inner concave surface curving away from the flat portion of the plate 22 that is essentially parallel to the housing surface 54. The dimple 46' also has an outer convex surface extending outwardly from the outer flat surface of the plate 22. As shown in FIG. 7, the dimple 46' preferably has a hole 45 extending through its central portion. A cavity in the form of an elongated dimple, with or without a hole, could also be provided and would function like the elongated hole 47. The advantages of each form of the cavity, a hole 46 or a dimple 46', are described above.

Each of the valve stems 26 is provided with a seal 40 surrounding and carried by the stem 26. In the drawings, the seal is shown in the form of an O-ring 40 that is disposed around a reduced diameter portion 42 of the valve stem 26 and that has a larger outer diameter than the main diameter of the stem 26. The seal 40 is in sealing contact with the passgeway sidewall all around the sidewall when the stem 26 is in either its first position or second position. The seal 40 is on one side of the outlet port 32, the outward side, when the stem 26 is in its first position and on the other side, the inward side, of the outlet port 32 when the stem 26 is in its second position.

Since the outer diameter of the O-ring seal 40 is greater than the main diameter of the stem 26, there is an annular space around the stem 26 between the stem 26 and the passageway sidewall regardless of the position of the stem 26. This permits the outlet port 32 to be in communication with the passageway 30 when the stem 26 is in either its first position or its second position. The inlet port 34 is spaced inwardly of the outlet port 32 and of the stem 26 and is always in communication with the passageway 30. When the stem 26 is in its first position, the outlet port 32 and the inlet port 34 are in open communication with each other via the passageway 30, including the annular space around the inner end of the stem 26. This communication between the inlet port 34 and the outlet port 32 is blocked by the O-ring seal 40 when the stem 26 is in its second position.

Communication between the outer end of the passageway and the ports 32, 34 is also determined by the position of the valve stem 26 and, thus, the position of the seal 40. When the stem 26 is in its first position, the seal 40 blocks communication between both ports 32, 34 and the outer end of the passageway 30. When the stem 26 is in its second position, communication between the inlet port 34 and the outer end of the passageway 30 is still blocked but communication between the outlet port 32 and the outer end of the passageway 30 is open. Therefore, when the stem 26 is in its second position, excess compressed air or other fluid in the outlet conduit and the outlet port 32 can exhaust through the outer end of the passageway 30 via the annular space around the stem 26. The exhausting air leaks out of the switch 20 between the plate 22 and the housing surface 54 and through the holes in the cavities.

In the preferred embodiment shown in the drawings, each passageway 30 has a stepped construction. The outer enlarged diameter portion described above provides space for the spring 38, a guide for the head 36, and a spring stop in the form of the shoulder 68. Next inward from the large diameter portion is an intermediate diameter portion, the sidewalls of which are dimensioned to provide a seat for the O-ring seal 40. Inward from the intermediate diameter portion is a reduced diameter portion with which the inlet port 34 is in open communication. This reduced diameter portion provides a guide for the inner end of the stem 26 when the stem 26 is in its second position. The guiding action of the reduced diameter sidewalls helps to keep the stem 26 aligned so that there is not excessive wear on the O-ring seal 40 and so that the smooth functioning of the switch is generally enhanced. Both the enlarged diameter outer portion and the intermediate diameter portion have an annular space around the valve stem 26 through which fluid in the outlet port 32 can exhaust when the stem 26 is in its second position.

Pivot connecting means are preferably provided for rotatably attaching the plate 22 to the valve housing 28. In the preferred embodiment shown in the drawings, the pivot connecting means includes a shaft 58 with a head at one end and threads at the other end. In the assembled switch 20, the shaft 58 extends through a cylindrical hole 56 in the housing 28 and a circular hole 57 in the plate 22. The head of the shaft abuts a surface of the housing 28 opposite the plate 22, and the threaded end of the shaft 58 extends outwardly from the plate 22. A nut 60 and washer 62 are provided for securing the shaft 58 in place to hold the plate 22 and housing 28 together. The connection is made loose enough so that the plate 22 may easily rotate with respect to the housing 28 in a plane essentially parallel to housing surface 54 and essentially perpendicular to the direction of reciprocation of the stems 26. In order to reprogram the switch 20, it is only necessary to remove the nut 60 and washer 62, replace plate 22 with another plate with a different programmed arrangement of cavities and flat surface portions, and resecure the nut 60 and washer 62 in place.

In the preferred embodiment shown in the drawings, the plate 22 is provided with an integral handle 24 for moving the plate 22 with respect to housing surface 54. This integral construction has the advantages of ease of manufacture, durability, and ease of operation. FIGS. 1 and 2 show a preferred mounting arrangement of the switch 20. The switch 20 is mounted to a support member 65 behind the dashboard 2 of a vehicle by means of two threaded bolts 67 that extend through the support member 65 and into threaded holes 66 in housing 28. The handle 24 projects into the passenger compartment through a slot 50. A knob 52 is secured to the end of the handle 24 that extends into the passenger compartment. The face of the dashboard 2 has various positions marked, including air-conditioning, heat, defrost, etc. To operate the switch 20, the operator simply moves the handle 24 within the slot 50 until the handle position corresponds with the marked climate control mode desired by the operator. The detent action of valve stem heads 36 extending into cavities 46, reinforced by the pressure of inflowing air and springs 38, helps to ensure precise correct positioning of the plate 22 with minimal operator effort. As described above, the correct positioning of the plate 22 automatically provides the correct combination of open and closed valves for obtaining the desired climate control mode.

The drawings show the preferred embodiment of the invention installed in an attitude in which the plate 22 is positioned above the housing 28. The installation shown in the drawings illustrates a typical use attitude of the switch. However, nothing in the drawings or in the description of the structure and operation of the preferred embodiment of the switch of this invention is intended to indicate that the use attitude of the switch is limited to a position in which the movable member is above the valve housing. It is intended to be understood that the switch of this invention can be used to advantage in various other attitudes, including an attitude in which the movable member is laterally adjacent to the valve housing and an attitude in which the housing is above the movable member.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A switch comprising:
   a valve housing including a passageway that has at least one port;
   a valve stem positioned to reciprocate longitudinally in the passageway to control said port, said stem including a head and having a first position and a second position;
   biasing means for biasing the stem toward its first position; and
   a movable member positionable adjacent to a housing surface and movable in a direction essentially perpendicular to the direction of reciprocation of the stem, said movable member including an essentially flat surface portion and at least one cavity, the positioning of said surface portion and said cavity being programmed to bring one of said portion and said cavity into alignment with the valve stem head when the movable member is in any one of a plurality of predetermined positions;
   wherein, when said surface portion is moved into alignment with the head, said portion bears against the head and moves the stem inwardly against the force of the biasing means into its second position; and when said cavity is moved into alignment with the head, the stem is urged into its first position by the biasing means; and
   wherein, when the stem is in its first position, an outer portion of the head extends into the cavity and an inner portion of the head is seated against an edge portion of the cavity.

2. A switch as described in claim 1, in which said housing surface is essentially flat, and the movable member comprises an essentially flat plate that is substantially parallel to said housing surface.

3. A switch as described in claim 2, in which the cavity comprises a hole extending through the plate.

4. A switch as described in claim 2, in which the cavity comprises a dimple on the flat plate.

5. A switch as described in claim 4, in which a central portion of the dimple has a hole extending therethrough.

6. A switch as described in claim 1, further comprising seal means surrounding and carried by the stem; said seal means being in sealing contact with a passageway sidewall all the way around the sidewall when the stem is in its first position or its second position, said seal means being on one side of the port when the stem is in its first position and on the other side of the port when the stem is in its second position, and the port being in communication with the passageway when the stem is in its first or second position.

7. A switch as described in claim 6, in which said port is an outlet port, and which further comprises an inlet port in the passageway positioned inwardly of the outlet port; said inlet port and said outlet port being in communication with each other when the stem is in its first position, and communication between said inlet port and said outlet port being blocked by the seal means when the stem is in its second position.

8. A switch as described in claim 7, in which fluid in the outlet port exhausts through the outer end of the passageway when the stem is in its second position.

9. A switch as described in claim 1, further comprising pivot connecting means for rotatably attaching the movable member to the valve housing.

10. A switch as described in claim 1, in which the movable member includes an integral handle portion for moving the movable member with respect to said housing surface.

11. A switch comprising:

a valve housing including a plurality of essentially parallel passageways, each such passageway having at least one port;

a valve stem positioned to reciprocate longitudinally in each of the passageways to control the corresponding port, each such stem including a head and having a first position and a second position;

biasing means for biasing each stem toward its first position; and a movable member positionable adjacent to a housing surface and movable in a direction essentially perpendicular to the direction of reciprocation of the stems, said movable member including a plurality of essentially flat surface portions and a plurality of cavities, the positioning of said surface portions and said cavities being programmed to bring one of said portions or one of said cavities into alignment with each valve stem head when the movable member is in any one of a plurality of predetermined positions;

wherein, when any one of said surface portions is moved into alignment with any one of the heads, said portion bears against said head and moves the corresponding stem inwardly against the force of the biasing means into its second position; and when any one of said cavities is moved into alignment with any one of the heads, the corresponding stem is urged into its first position by the biasing means; and wherein, when any one of the stems is in its first position, an outer portion of its head extends into one of the cavities and an inner portion of its head is seated against an edge portion of said cavity.

12. A switch as described in claim 11, in which said housing surface is essentially flat, and the movable member comprises an essentially flat plate that is substantially parallel to said housing surface.

13. A switch as described in claim 12, in which each cavity comprises a hole extending through the plate.

14. A switch as described in claim 12, in which each cavity comprises a dimple on the flat plate.

15. A switch as described in claim 14, in which a central portion of each dimple has a hole extending therethrough.

16. A switch as described in claim 11, further comprising seal means surrounding and carried by at least one of the stems; said seal means being in sealing contact with a passageway sidewall all the way around the sidewall when the stem is in its first position or its second position, said seal means being on one side of the corresponding port when the stem is in its first position and on the other side of said port when the stem is in its second position, and said port being in communication with the passageway when the stem is in its first or second position.

17. A switch as described in claim 16, in which said port is an outlet port, and which further comprises an inlet port in the passageway positioned inwardly of the outlet port; said inlet port and said outlet port being in communication with each other when the stem is in its first position, and communication between said inlet port and said outlet port being blocked by the seal means when the stem is in its second position.

18. A switch as described in claim 17, in which fluid in the outlet port exhausts through the outer end of the passageway when the stem is in its second position.

19. A switch as described in claim 11, further comprising pivot connecting means for rotatably attaching the movable member to the valve housing.

20. A switch as described in claim 11, in which the movable member includes an integral handle portion for moving the movable member with respect to said housing surface.

21. A switch as described in claim 11, in which each passageway has an inlet port and an outlet port, and the valve housing further includes a manifold in open communication with at least two of said inlet ports.

22. A switch as described in claim 11, in which at least one of said cavities is elongated to allow a valve stem, which is in its first position with its head extending into said elongated cavity when the movable member is in a first one of its predetermined positions, to remain in its first position when the movable member is moved from said first predetermined position to a second predetermined position.

* * * * *